W. A. MILES.
Car-Wheel.

No. 162,186.  Patented April 20, 1875.

Witnesses:
Harry C. Clark.
H. E. Matthews

Inventor:
W. A. Miles.
By H. W. Beadle & Co.
Attys.

UNITED STATES PATENT OFFICE.

WILLIAM A. MILES, OF COPAKE IRON WORKS, NEW YORK.

IMPROVEMENT IN CAR-WHEELS.

Specification forming part of Letters Patent No. 162,186, dated April 20, 1875; application filed December 29, 1874.

*To all whom it may concern:*

Be it known that I, WILLIAM A. MILES, of Copake Iron Works, in the county of Columbia and State of New York, have invented a new and useful Improvement in Car-Wheels; and I do hereby declare that the following is a full and exact description of the same, reference being had to the accompanying drawings and to the letters of reference marked thereon.

This invention is a car-wheel, consisting of three parts, the central portion, the tire, and an intermediate metal portion uniting the two main portions together, the whole forming an entirety, constituting a new wheel as an article of manufacture.

Figure 1:
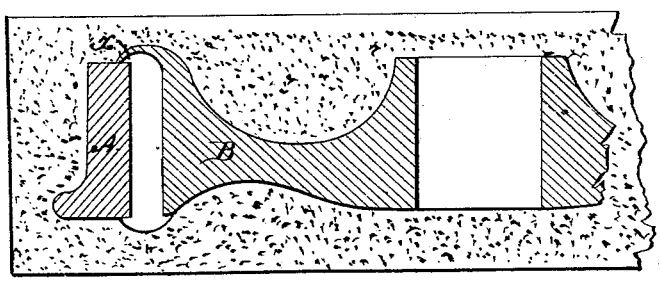
Figure 2:
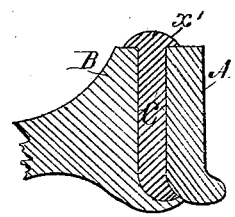
Figure 3:
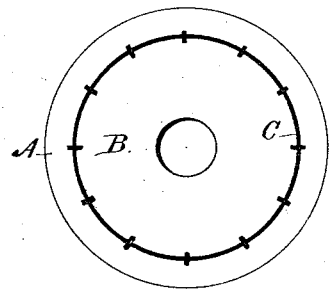
Figure 4:
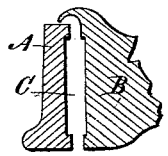
Figure 5:
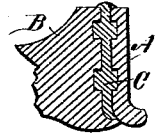

In the drawings, Figure 1 represents a sectional elevation of the central portion and tire as they lie in the mold; Figs. 2 and 5, partial sectional elevation of the complete wheel; Fig. 3, a plan view of a form of key-seat adapted to resist the strain exerted when the brakes are applied to the tire, to cause the same to turn upon the central portion; Figs. 4 and 5, modified form of the adjacent faces of the tire and central portion.

To enable others skilled in the art to make and use my invention, I will now proceed to describe fully its construction and manner of operation.

A represents the tire formed preferably of steel or other hard metal. B represents the central portion, formed preferably of softer metal, such as cast or wrought iron. C represents the intermediate uniting metal, which may be so introduced as to weld the adjacent faces of the independent parts together, or to solder the same together, or to serve simply as a key to bind them together. X represents an overhanging flange projecting from the central part, which is employed for the purpose of preventing the sand with which the parts are covered during the welding process from falling into the opening. X' represents a projection upon the metal C, which may be formed in the process of casting by a depression in the sand, for the double purpose of forming a perfect union, and also making a continuous key for locking the parts together.

If desired, the adjacent faces of the central portion and tire may be formed with corresponding recesses, as shown in Fig. 3, or key-seats, as shown in Figs. 4 and 5, or simply be arranged with an intermediate space, as shown in Fig. 1.

The processes by means of which this wheel is produced form the subject of other applications, and need not, therefore, be particularly described.

It may be stated generally, however, that the intermediate uniting metal may be caused to pass between the parts to be connected in a continuous stream until the adjacent faces are fused, or it may be introduced as a solder simply, or as a metallic key to lock the parts together.

One of the marked advantages of the wheel is that the intermediate uniting metal may be of such a character as to permit the tire when worn to be removed for the purpose of introducing a new one.

I am aware that wheels constructed in three metallic parts, the inner and outer parts being cast on the intermediate part, are not new, and this I therefore disclaim.

Having thus fully described my invention, what I claim as new, and desire to secure by Letters Patent, is—

1. As a new article of manufacture, a car-wheel, consisting of three parts, a central portion, B, a tire, A, and an intermediate metal welding portion uniting the main portions to form a single solid structure, substantially as described.

2. A car-wheel, having the tire A and body B, with corresponding recesses, and an intermediate uniting metal, filling said recesses, substantially as described.

This specification signed and witnessed this 18th day of November, 1874.

WILLIAM A. MILES.

Witnesses:
  CONRAD A. WHEELER,
  E. H. TEN EYCK.